March 19, 1940.   R. S. CARTER   2,194,293
PROCESS OF MAKING PHOTOGRAPHIC PRINTS IN COLOR
Filed Oct. 16, 1937
*Fig. 1.*
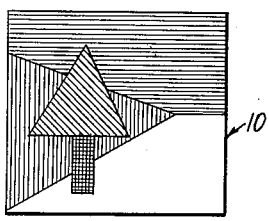
*Fig. 2.*
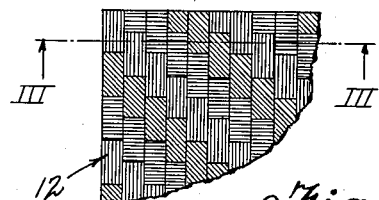
*Fig. 3.*
*Fig. 4.*
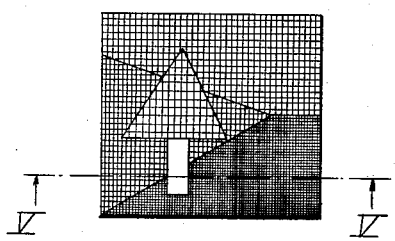
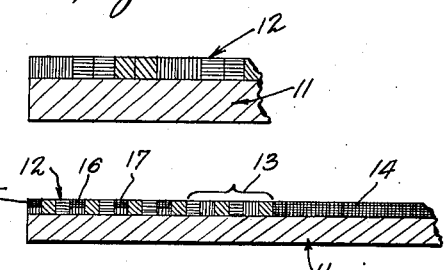
*Fig. 5.*
*Fig. 6.*
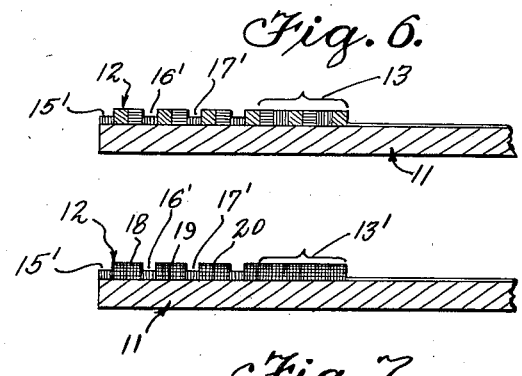
*Fig. 8.*
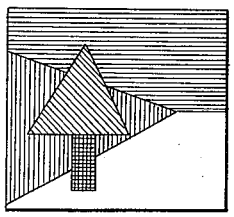
*Fig. 7.*
Inventor
Rowland S. Carter
By Lyon & Lyon
Attorneys Patented Mar. 19, 1940

2,194,293

UNITED STATES PATENT OFFICE 2,194,293

PROCESS OF MAKING PHOTOGRAPHIC PRINTS IN COLOR

Rowland S. Carter, Los Angeles, Calif.

Application October 16, 1937, Serial No. 169,448

5 Claims. (Cl. 95—2)

This invention relates to a method of producing photographic prints which when viewed by reflected light carry an image in substantially natural color. Images or prints giving the effect of color when viewed by reflected light are to be distinguished from transparencies which give the effect of color when viewed by transmitted light only.

Heretofore no simple process of producing photographic prints in virtually natural color has been known. The present invention relates to a process which is relatively simple and which can be used in producing direct color prints from any transparency, negative or positive having an inherently colored image thereon, or from any of the developed color transparencies obtained by the use of color forms or from any Finlay color plate, in which the black and white image, taken through a separate screen-type filter having regularly spaced squares or the like of different colors, is then viewed or projected in conjunction with a viewing screen carrying similarly placed colors, or from transparencies such as are obtained by Kodachrome or Dufay color films.

Generally stated, the method of this invention includes the use of a relatively thin panchromatic-type emulsion carried by a suitable base, said emulsion being impregnated in a regular manner with substantially complementary dyes. The colored transparency is printed by contact or enlargement upon the emulsion described. The emulsion bearing the latent image is then developed. The developed image is then etched so as to remove exposed silver emulsion and dye associated therewith and the print is then redeveloped, the print being exposed to light prior to said redevelopment whereby the final print includes a graduated black and white image, said black and white image completely masking the dye in those portions which represent black and permitting the selected dye to be visible through the lighter developed portions of the image so as to impart a desired and virtually natural color to other portions of the image, the resulting print creating the effect of natural color when viewed by reflected light.

It is an object of this invention, therefore, to disclose and provide a simple process of obtaining directly colored prints of photographic images.

A further object is to disclose and provide a method of producing prints in virtually natural color when viewed by reflected light from colored transparencies.

A still further object is to provide a method in which directly colored photographic prints may be obtained by a method which does not involve problems of registration or transfer and which may be carried out in a ready and facile manner.

Another object is to provide a printing paper carrying a panchromatic emulsion and also carrying fixed dyes which impart color to the print, said fixed dyes being in combination with fugitive dyes which act as light or color filters during the photographic printing.

These and other objects, uses and advantages of the invention will become apparent to those skilled in the art from the following detailed description of illustrative forms. In such description reference will be made to the appended drawing, in which:

Fig. 1 diagrammatically represents an object or color transparency thereof.

Fig. 2 is an enlarged view of a portion of a printing paper which may be employed in carrying out the invention.

Fig. 3 is an enlarged section taken along the plane III—III of Fig. 2.

Fig. 4 is a plan view diagrammatically illustrating the appearance of a print taken of the transparency shown in Fig. 1 prior to etching said print.

Fig. 5 is a section approximately along the plane V—V of Fig. 4 diagrammatically illustrating the effect on the emulsion.

Fig. 6 is a section through the partially treated print after etching.

Fig. 7 is a section through said print after it had been redeveloped.

Fig. 8 is a plan view of the print in its final form.

In order to simplify the description, one illustrative form of the method will be described in detail. It will be assumed that the original transparency 10 shown in Fig. 1 depicts a white foreground, a green tree in said foreground, the tree being provided with a black trunk, a red hillside and a blue sky. The process is directed toward the production of color prints of this transparency.

In carrying out the invention use is made of a paper comprising a base 11 and an emulsion layer 12. The base may be of paper of any suitable quality. The emulsion is preferably a thin panchromatic-type emulsion. An emulsion known as direct positive panchromatic may be used to good advantage.

This positive emulsion 12 has applied thereto three substantially complementary colors or dyes, the dyes being of a type capable of actually impregnating the emulsion. Dyes or color coatings which would remain on the surface of the emulsion are to be distinguished therefrom. The three complementary colors, such as, for example, appropriate shades of red, blue and yellow-green, may be applied to the surface of the emulsion by a suitable printing operation, the dyes or colors being applied in a regulated manner. The dyes may be applied in the form of thin lines, squares, rectangles or in any other suitable manner. These dyes impregnate the entire emulsion.

As shown in Figs. 2 and 3, the emulsion 12 may have dyes, such as red, yellow or yellow-green and blue, sequentially arranged in rows, the adjoining row having the red displaced longitudinally as shown. In vertical section, illustrated in Fig. 3, the red, blue and yellow-green portions of the emulsion also appear sequentially.

The transparency 10 is printed upon the emulsion 12. Fig. 5 is a vertical section taken through the emulsion carried by the paper 11 after the transparency 10 has been printed thereon and the print developed. The section is taken along the plane V—V of Fig. 4. Where the original transparency 10 carried the opaque or black tree trunk, indicated by the zone 13, the emulsion carried by the paper 11 has not been exposed. In the white foreground area exposure has taken place practically to the bottom of the emulsion, as shown at 14. In the red portion of the transparency 10 the light passing through the transparency has caused exposure to take place in those portions of the emulsion which carry the red dye and exposure in the upper portions of such red dye or red dye impregnated portions is now shown in strips 15, 16, 17, etc. Those strips of the emulsion which are impregnated with the yellow green and blue dye are unexposed. The strips 15, 16, 17 are not exposed completely but only partially since the intensity of the light passing through the red portion of the transparency 10 is not as intense as the light passing through the white or transparent foreground area of the transparency 10.

Fig. 4 represents a plan view of the exposed and developed print showing the foreground black, indicating complete exposure, the tree trunk white or transparent and the other colored areas a substantially uniform gray. The coloring indicated in Fig. 4 is illustrative of the amount of silver affected by the printing and developing operations and is not indicative of actual or true color of such areas.

After the print has been developed as heretofore described, it is subjected to the action of an etching bath, the etching liquid being adapted to dissolve exposed silver in those areas where the silver has actually been exposed or reduced during printing and development.

Fig. 6 is a transverse section taken along the same plane as is shown in Fig. 5 but diagrammatically illustrates the effect of the etching solution. Since no silver was exposed in the tree trunk area 13, the etching liquid has had no effect thereon. The exposed silver 14 representing the white foreground has now been removed by the etching liquid. Similarly, pockets 15', 16' and 17' have been formed in that portion of the emulsion which had originally been present under the red portion of the transparency 10, said pockets representing the exposed silver 15, 16 and 17 indicated in Fig. 5.

After the completion of the etching operation followed by a suitable washing, the print may be dried. It is also exposed to light. The length of time that the print may be exposed to light may be materially varied but should not be sufficiently excessive to cause any reversal. After such exposure the print is again developed, the results of such exposure and development being diagrammatically illustrated in Fig. 7. Area 13, now indicated at 13', is now dense with reduced silver. Areas 18, 19 and 20, which originally contained emulsion impregnated with blue and yellow-green dyes, are also dense with reduced silver. The intervening portions, including pockets 15', 16' and 17', contain but very little reduced silver since during the etching operation much of the silver lying below the fully exposed silver has also been removed by the etching solution. Below these pockets 15', 16' and 17' one finds the red dye carried by the gelatin. As a result, the entire area of the print which originally was exposed to light passing through the red portion of the transparency 10 is a mixture of black and red, creating the effect of an over-all red. The finished print is therefore as shown in Fig. 8, the various areas of the print being colored in substantially the same manner as the original transparency 10, the print of Fig. 8 differing from the transparency 10 in that the colors are evident and can be observed by reflected light whereas the coloring of the transparency 10 is only evident when such transparency is examined by transmitted light.

In the description given hereinabove and in order to simplify the explanation, reference has been made only to red, black and white portions of the transparency but those skilled in the art will readily appreciate that the blue, green and other portions of the original transparency produce a similar effect upon similarly colored portions of the emulsion 12.

As has been stated hereinbefore, direct positive paper is preferably employed. The paper preferably includes gelatin and latex, these ingredients being embodied directly in the paper. A suitable mixture may include 400 pounds of blanc fixe or barytes (containing 25% water), 50 pounds of gelatin dissolved in 40 gallons of water, to which mixture is then added 1500 ccm. of saturated alum solution and an appropriate quantity of latex dispersion. ½ gallon of latex (containing 35% to 40% of non-volatile constituents) may be added to 640 pounds of the mixture above described.

In other words, the base of the emulsion may be made from the constituents disclosed and if desired cellulosic fibre may be an added ingredient thereof. The base should be dye-proof and not stain and this property is imparted to the base by the latex composition above identified. If desired, the above or other acid, alkali and dye-proof composition may form a surface layer on a paper base.

The dyes which are preferably used are azo dyestuffs containing hydroxyl groups and preferably including the heavier metals, such as chromium, copper, nickel, cobalt and the like. The dyes should also preferably be of the non-bleeding type and not removable by washing. Dyes answering these requirements may be purchased from many sources known to the art. Noalan Red and Noalan Blue are illustrative dyes which have been found suitable. It is desirable to employ a stable yellow dye which will not run and instead become a fixed residual dye in the print but in conjunction therewith it is often desirable to employ a more fugitive green dye capable of acting as a light filter during the initial printing exposure. This fugitive dye should be capable of being washed out during development (as is the case with most basic dyes) and then leave a desired shade of yellow. A combination of such dyes is herein referred to as yellow-green. Since the dyes carried by the emulsion are actually both final dyes and also selective filters, the use of washable or removable filtering dyes in conjunction with the fixed dyes is one of the main elements of my invention. These fugitive dyes need not be perfect light filters individually but should, in combination with the fixed dye, act as a suitable filter. The fugitive dye associated with one of the fixed dyes should be adapted to act as a filter capable of restraining light of a color other than that of the fixed complementary dye with which it is associated.

The first developing solution may comprise any desired developer, preferably such developing solution having the characteristics of an active contrast developer containing some alkali and at the same time having some hardening properties. A suitable solution may be prepared as follows:

Solution "A"

| | | |
|---|---|---|
| Metol | grains | 100 |
| Hydroquinone | do | 100 |
| Sodium sulfite | ounces | 1.25 |
| Sodium carbonate | do | 2.0 |
| Potassium bromide | grains | 50 |
| Water to make | ounces | 32 |

Solution "B"

| | | |
|---|---|---|
| Sodium hydroxide | ounces | 1.75 |
| Water to make | do | 32 |

Equal parts of "A" and "B" are then mixed and for every ounce of the above solution there should be added 3 drops of a saturated hypo solution, 1 drop of formaldehyde and ¾ ounce of potassium permanganate.

The etching solution may utilize hydrogen peroxide as the active agent and preferably contains some bromide for the purpose of slowing down the action of the developer during secondary developing. The combination of hydrogen peroxide and a bromide such as potassium bromide, appears to facilitate etching and the etching effect may be increased by increasing the amount of bromide. Moreover, such etching solution may include a hardening agent for the purpose of preventing the gelatin from being washed out completely. An illustrative etching fluid may comprise:

| | | |
|---|---|---|
| Hydrogen peroxide | ounce | 1 |
| Cupric sulfate | do | 1 |
| Nitric acid | minims | 81 |
| Potassium bromide | grains | 5 |
| Water to make | ounces | 32 |

The second developing solution may include any desired developer, although a slow developer is preferred. An illustrative formula for this secondary developing solution is as follows:

| | | |
|---|---|---|
| Metol | grains | 55 |
| Sodium sulfite | ounces | 1½ |
| Hydroquinone | grains | 30 |
| Sodium carbonate | ounces | 1½ |
| Potassium bromide | grains | 45 |
| Water to make | ounces | 32 |

Although specific formulas, ingredients and materials have been mentioned hereinabove, it is to be understood that the invention is not limited thereto but instead various other similarly acting compounds may be employed. Any and all changes coming within the scope of the appended claims are embraced thereby.

I claim:

1. A method of the character described comprising: printing a photographic inherently colored image from a transparency carrying such colored image, onto a paper base provided with a relatively thin panchromatic-type silver emulsion, said emulsion being impregnated with substantially complementary dyes arranged in a regular manner over the surface, each dye extending virtually throughout the thickness of the emulsion; developing the print; etching the print to remove exposed silver emulsion; and redeveloping the etched print and exposing the print to light prior to said redevelopment, whereby a print, including a graduated black and white image and dyes simulating natural color, is obtained.

2. A method of the character described comprising: printing a photographic inherently colored image from a transparency carying such colored image, onto a paper base provided with a relatively thin panchromatic-type silver emulsion, said emulsion being impregnated with substantially complementary dyes of the azo type arranged in a regular manner over the surface, each dye extending virtually throughout the thickness of the emulsion; developing the print; etching the print to remove exposed silver emulsion; and redeveloping the etched print and exposing the print to light prior to said redevelopment, whereby a print, including a graduated black and white image and dyes simulating natural color, is obtained.

3. A method of the character described comprising: printing a photographic inherently colored image from a transparency carrying such colored image, onto a paper base provided with a relatively thin panchromatic-type silver emulsion, said emulsion being impregnated with substantially complementary dyes of the azo type arranged in a regular manner over the surface; developing the print; etching the print with a solution containing hydrogen peroxide and a gelatin hardening agent, to remove exposed silver emulsion; and redeveloping the etched print and exposing the print to light prior to said redevelopment, whereby a print, including a graduated black and white image and dyes simulating natural color, is obtained.

4. A method of the character described comprising: printing a photographic inherently colored image from a transparency carrying such colored image, onto a paper base provided with a relatively thin panchromatic-type silver emulsion, said emulsion being impregnated with substantially complementary dyes arranged in a regular manner over the surface; developing the print; etching the print with a solution containing hydrogen peroxide to remove exposed silver emulsion; and redeveloping the etched print with a slow developer and exposing the print to light prior to said redevelopment, whereby a print, including a graduated black and white image and dyes simulating natural color, is obtained.

5. A method of the character described comprising: printing a photographic, inherently colored image from a transparency onto a paper base provided with a relatively thin panchromatic-type silver emulsion, said emulsion being impregnated with substantially complementary fixed dyes arranged in a regular manner over the surface area, each dye extending virtually throughout the thickness of the emulsion, and a fugitive dye associated with one of said complementary dyes, said fugitive dye being adapted to act as a filter adapted to restrain light of a color other than that of the complementary dye with which it is associated; developing the print; etching the print with a solution containing hydrogen peroxide and potassium bromide to remove exposed silver emulsion; and redeveloping the etched print and exposing the print to light prior to said redevelopment, whereby a print including a graduated black and white image and dyes simulating natural color, is obtained.

ROWLAND S. CARTER.